United States Patent
Chen et al.

(10) Patent No.: US 11,739,445 B2
(45) Date of Patent: Aug. 29, 2023

(54) TEMPERATURE-RESPONSIVE MATERIAL, TEMPERATURE-RESPONSIVE FIBER AND PREPARATION METHOD THEREOF

(71) Applicant: Taiwan Textile Research Institute, New Taipei (TW)

(72) Inventors: Wen-Hsiang Chen, New Taipei (TW); Chun-Hung Lin, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 612 days.

(21) Appl. No.: 16/835,324

(22) Filed: Mar. 31, 2020

(65) Prior Publication Data

US 2021/0010165 A1 Jan. 14, 2021

(30) Foreign Application Priority Data

Jul. 8, 2019 (TW) ................................ 108123970

(51) Int. Cl.
*D01F 8/14* (2006.01)
*D01F 8/18* (2006.01)
(Continued)

(52) U.S. Cl.
CPC ............. *D01F 8/14* (2013.01); *C08G 63/183* (2013.01); *D01D 5/082* (2013.01); *D01F 6/36* (2013.01); *D01F 8/18* (2013.01); *Y10T 428/29* (2015.01)

(58) Field of Classification Search
CPC ..... D01F 8/14; D01F 1/10; D01F 6/62; D01F 6/86; D01F 6/92; C08L 2205/025; C08L 2205/03
See application file for complete search history.

(56) References Cited

U.S. PATENT DOCUMENTS

| | | |
|---|---|---|
| 5,112,903 A | 5/1992 | Sakakibara et al. |
| 2011/0250409 A1 | 10/2011 | Marte et al. |
| 2013/0199692 A1 | 8/2013 | Gutierrez et al. |

FOREIGN PATENT DOCUMENTS

| | | |
|---|---|---|
| CN | 1569933 | 1/2005 |
| CN | 102875831 | 1/2013 |

(Continued)

OTHER PUBLICATIONS

Mishra, S. P. et al. "Fibers from Poly(ethylene Terephthalate) and Poly(butylene Terephthalate) Blends. I. Mechanical Behavior." Journal of Applied Polymer Science. 33(1987): 759-768 (Year: 1987).*

(Continued)

*Primary Examiner* — Peter Y Choi
*Assistant Examiner* — Jenna N Chandhok
(74) *Attorney, Agent, or Firm* — JCIPRNET

(57) ABSTRACT

A temperature-responsive material having a structure represented by formula (I):

(Continued)

is provided, where in formula (I), X has a structure represented by formula (i) or formula (ii):

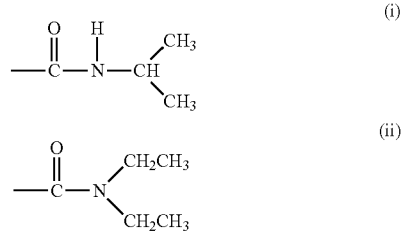

x and y are in a molar ratio of 9:1 to 1:3, n is an integer of 7 to 120, and m is an integer of 10 to 1,000.

11 Claims, 1 Drawing Sheet

(51) Int. Cl.
*D01D 5/08* (2006.01)
*C08G 63/183* (2006.01)
*D01F 6/36* (2006.01)

(56) References Cited

FOREIGN PATENT DOCUMENTS

| CN | 105585705 | 5/2016 |
|---|---|---|
| CN | 105586659 | 5/2016 |
| CN | 108118533 | 6/2018 |
| CN | 109385893 | 2/2019 |

OTHER PUBLICATIONS

Golshaei, Parisa et al. "Chemical Modification of PET Surface and Subsequent Grafter Copolymerization with Poly(N-Isopropylacrylamide)." Reactive and Functional Polymers. 118 (2017): 26-34. (Year: 2017).*

Zhang Baohua et al., "Studies On the Hydroscopicity and Antistatic Propertiy of PET-PEG Block Copolymer Fiber and PET/PET—PEG Blend Fiber", Synthetic Fiber vol. 28 No. 1, with English translation thereof, Feb. 15, 1999, pp. 1-18.

"Office Action of China Counterpart Application", dated Aug. 24, 2022, p. 1-p. 9.

* cited by examiner

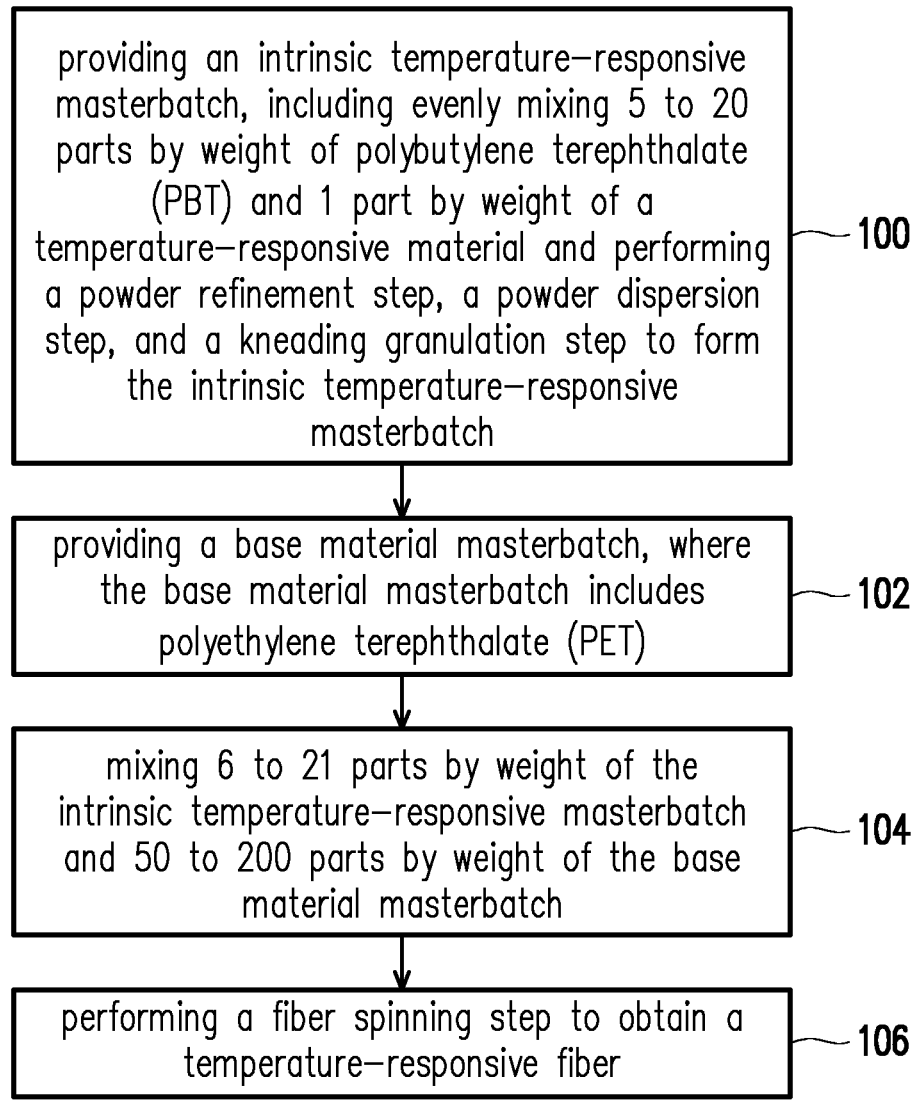

TEMPERATURE-RESPONSIVE MATERIAL, TEMPERATURE-RESPONSIVE FIBER AND PREPARATION METHOD THEREOF

CROSS REFERENCE TO RELATED APPLICATION

This application claims the priority benefit of Taiwan patent application serial no. 108123970, filed on Jul. 8, 2019. The entirety of the above-mentioned patent application is hereby incorporated by reference herein and made a part of specification.

BACKGROUND OF THE DISCLOSURE

1. Field of the Disclosure

The disclosure relates to a textile material, and in particular, to a temperature-responsive material, a temperature-responsive fiber, and a preparation method thereof.

2. Description of Related Art

As the requirements on the quality of life are getting higher, the wearing comfort has become one of the important factors for purchasing clothes. Accordingly, functional clothing having an adjustment mechanism to adapt to seasonal temperature differences, air-conditioned environment, and temperature conditions and body temperature change when sweating during exercise has become a rising star in the current textile market.

When applied to sportswear, textiles need to provide users with properties such as fast-drying, coolness, and reduced heat loss to maintain the thermal comfort while the environmental conditions change. In addition, functional clothing needs to overcome the discomfort caused by the indoor/outdoor temperature difference and meet the demand for leisure and exercise, in order to become suitable for various occasions in daily life. However, conventional clothing with moisture absorption and sweat dissipation mainly relies on the fabric structure design and the finishing technique (single/double sided coating), and therefore may lose the temperature/humidity regulation function due to sultriness in the case of saturated humidity during exercise.

SUMMARY OF THE DISCLOSURE

Accordingly, the disclosure provides a temperature-responsive material, a temperature-responsive fiber, and a preparation method thereof. The prepared temperature-responsive material is highly compatible with a polyester base material and therefore can be melt spun to prepare an intrinsic temperature-responsive fiber exhibiting properties such as fast-drying, coolness, and reduced heat loss (anti-chilling after exercise), to steadily maintain the (thermal) comfort of clothing.

The disclosure provides a temperature-responsive material having a structure represented by formula (I):

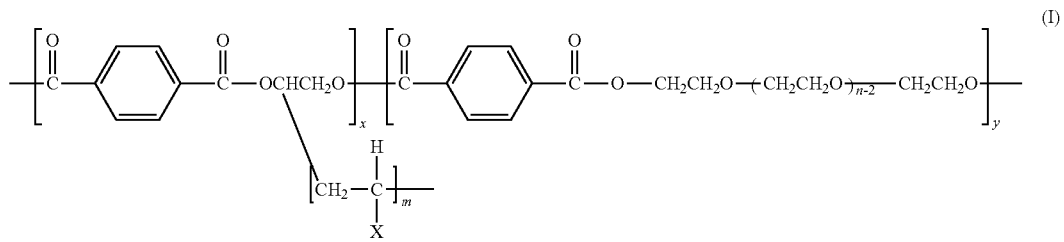

where in formula (I),
X has a structure represented by formula (i) or formula (ii):

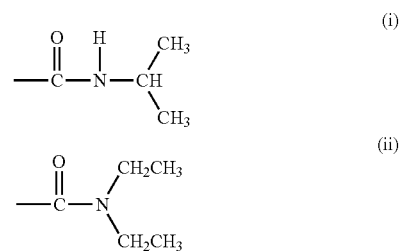

x and y are in a molar ratio of 9:1 to 1:3,
n is an integer of 7 to 120, and
m is an integer of 10 to 1,000.

In an embodiment of the disclosure, a weight-average molecular weight of the temperature-responsive material is about 10,000 to about 150,000.

In an embodiment of the disclosure, a lower critical solution temperature (LCST) of the temperature-responsive material is about 29° C. to about 35° C.

The disclosure further provides a temperature-responsive fiber, including: about 1 part by weight of a temperature-responsive material, about 5 to 20 parts by weight of polybutylene terephthalate (PBT), and about 50 to 200 parts by weight of polyethylene terephthalate (PET), where the temperature-responsive material has a structure represented by formula (I).

In an embodiment of the disclosure, the temperature-responsive fiber may further include about 0.1 to 0.35 parts by weight of an antioxidant, where the antioxidant is a hindered phenol antioxidant, a phosphorus antioxidant, or a combination thereof.

In an embodiment of the disclosure, the antioxidant is a combination of the hindered phenol antioxidant and the phosphorus antioxidant at a ratio in a range of about 1:5 to about 5:1.

In an embodiment of the disclosure, a fiber specification of the temperature-responsive fiber is 75d/72f to 75d/36f.

The disclosure further provides a method for preparing a temperature-responsive fiber, and the method includes the following steps. An intrinsic temperature-responsive masterbatch is provided, where about 5 to 20 parts by weight of polybutylene terephthalate (PBT) and about 1 part by weight of a temperature-responsive material are evenly mixed, and a powder refinement step, a powder dispersion step, and a kneading granulation step are performed to form the intrinsic temperature-responsive masterbatch. A base material masterbatch is provided, where the base material masterbatch includes polyethylene terephthalate (PET). About 6 to 21 parts by weight of the intrinsic temperature-responsive masterbatch and about 50 to 200 parts by weight of the base material masterbatch are mixed. A fiber spinning step is performed to obtain a temperature-responsive fiber, where the temperature-responsive material has a structure represented by formula (I).

In an embodiment of the disclosure, 0.1 to 0.35 parts by weight of an antioxidant may be added and evenly mixed with the foregoing parts by weight of polybutylene terephthalate (PBT) and the foregoing parts by weight of the temperature-responsive material.

representation that avoids enumerating all numerical values in this range one by one. Therefore, recording a specific numerical range is equivalent to disclosing any numerical value within this numerical range and a smaller numerical range defined by any numerical value within this numerical range, as if the numerical value and the smaller numerical range are explicitly written in the specification.

The disclosure provides a temperature-responsive material, which is highly compatible with a polyester base material and therefore can be melt spun to prepare an intrinsic temperature-responsive fiber. Compared with a conventional fiber prepared by using a conventional coating technology, the intrinsic temperature-responsive fiber of the disclosure can dry faster at high temperature to achieve a cooling effect, and can slow the moisture drying rate at low temperature to maintain the body temperature and reduce heat loss, thus effectively overcoming the disadvantages of the conventional fiber.

In an embodiment, the temperature-responsive material of the disclosure has a structure represented by formula (I):

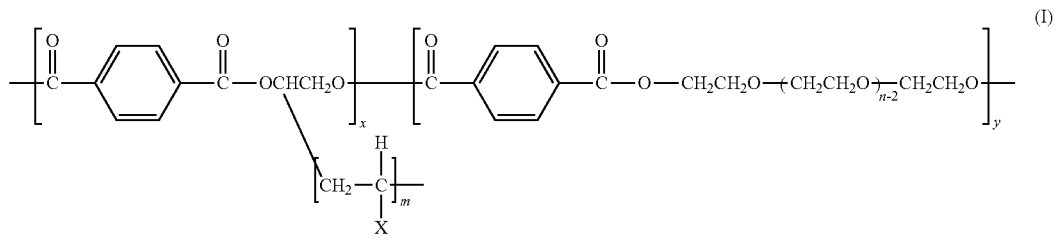

In an embodiment of the disclosure, a spinning temperature is about 270° C. to 295° C. and a spinning speed is about 2,000 to 3,000 meters per minute in the fiber spinning step.

In an embodiment of the disclosure, a particle size of the temperature-responsive material after the powder refinement step and the powder dispersion step is in a range of about 1 μm to 500 μm.

Based on the above, the temperature-responsive material of the disclosure is highly compatible with a polyester base material and therefore can be melt spun to prepare an intrinsic temperature-responsive fiber. The intrinsic temperature-responsive fiber of the disclosure can effectively enable a fabric to dynamically adjust the temperature and humidity as the ambient temperature or body temperature changes. Therefore, the intrinsic temperature-responsive fiber of the disclosure can overcome the disadvantage of conventional clothing with moisture absorption and sweat dissipation which loses the temperature/humidity regulation function due to sultriness in the case of saturated humidity during exercise.

In order to make the aforementioned and other objectives and advantages of the disclosure comprehensible, embodiments accompanied with figures are described in detail below.

BRIEF DESCRIPTION OF THE DRAWINGS

The FIGURE is a flow chart of a preparation method of a temperature-responsive fiber according to an embodiment of the disclosure.

DESCRIPTION OF THE EMBODIMENTS

In this specification, a range represented by "from a numerical value to another numerical value" is a summary where in formula (I), X has a structure represented by formula (i) or formula (ii):

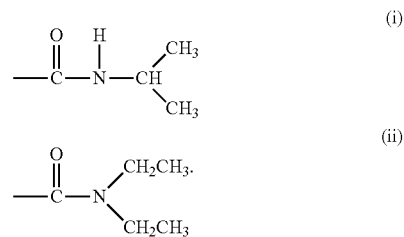

In an embodiment, x and y are in a molar ratio of about 9:1 to about 1:3, for example, 8:1, 7:1, 6:1, 5:1, 4:1, 3:1, 2:1, 1:1 or 1:2.

In an embodiment, n is an integer of 7 to 120, for example, 10, 20, 30, 40, 50, 60, 70, 80, 90, 100 or 110.

In an embodiment, m is an integer of 10 to 1,000, for example, 100, 200, 300, 400, 500, 600, 700, 800 or 900.

In an embodiment, a weight-average molecular weight of the temperature-responsive material is about 10,000 to about 150,000, for example, 20,000, 30,000, 40,000, 50,000, 60,000, 70,000, 80,000, 90,000, 100,000, 110,000, 120,000, 130,000 or 140,000.

By adjusting the ranges of the molar ratio of x and y, the value of m, the value of n, and the weight-average molecular weight, the compatibility of the temperature-responsive material of the disclosure with a polyester base material can be significantly improved, so that the subsequently formed temperature-responsive fiber can effectively dynamically adjust the temperature and humidity as the ambient temperature or body temperature change.

In an embodiment, a lower critical solution temperature (LCST) of the temperature-responsive material is about 29° C. to about 35° C. In particular, when X in formula (I) of the temperature-responsive material has the structure represented by formula (i), the lower critical solution temperature (LCST) of the temperature-responsive material is about 34° C. to about 35° C. When X in formula (I) of the temperature-responsive material has the structure represented by formula (ii), the lower critical solution temperature (LCST) of the temperature-responsive material is about 29° C. to about 30° C.

The disclosure further provides a method for preparing a temperature-responsive fiber. The FIGURE is a flowchart of a preparation method of a temperature-responsive fiber according to an embodiment of the disclosure.

Referring to the FIGURE, in step S100, an intrinsic temperature-responsive masterbatch is provided first, where about 5 to 20 parts by weight of polybutylene terephthalate (PBT) and about 1 part by weight of a temperature-responsive material are evenly mixed, and a powder refinement step, a powder dispersion step, and a kneading granulation step are performed to form the intrinsic temperature-responsive masterbatch. In an embodiment, in the step of evenly mixing about 5 to 20 parts by weight of polybutylene terephthalate (PBT) and about 1 part by weight of the temperature-responsive material, about 0.1 to 0.35 parts by weight of an antioxidant may be further added and evenly mixed together with the PBT and the temperature-responsive material, making the subsequently formed intrinsic temperature-responsive masterbatch stable.

In an embodiment, the temperature-responsive material has a structure represented by formula (I). In an embodiment, the powder refinement step is performing powder grinding at normal temperature by using a pulverizer. In an embodiment, the powder dispersion step is performing powder dispersion at a rotational speed of about 500 rpm for about 5 minutes. In an embodiment, a particle size of the temperature-responsive material after the powder refinement step and the powder dispersion step is in a range of about 1 µm to 500 µm. In an embodiment, in the kneading granulation step, a kneading temperature is about 255 to 275° C., and a screw speed is about 150 to 250 rpm.

In step S102, a base material masterbatch is provided, where the base material masterbatch includes polyethylene terephthalate (PET).

In step S104, about 6 to 21 parts by weight of the intrinsic temperature-responsive masterbatch and about 50 to 200 parts by weight of the base material masterbatch are mixed.

In an embodiment, the antioxidant includes a hindered phenol antioxidant, a phosphorus antioxidant or a combination thereof. In particular, the hindered phenol antioxidant and the phosphorus antioxidant may be used separately or in mixture.

In an embodiment, the hindered phenol antioxidant has a structure represented by the following formula:

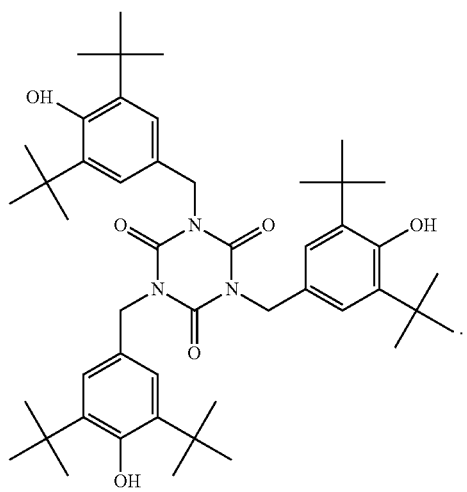 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

In an embodiment, the hindered phenol antioxidant is model DEOX 3114 available from CHITEC TECHNOLOGY CO., LTD.

In an embodiment, the phosphorus antioxidant has a structure represented by the following formula:

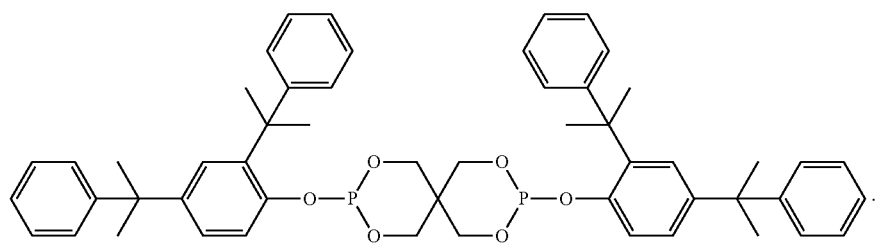 [SMILES: CC(C)(c1ccccc1)c1ccc(OP2OCC3(CO2)COP(Oc2ccc(C(C)(C)c4ccccc4)cc2C(C)(C)c2ccccc2)OC3)c(C(C)(C)c2ccccc2)c1]

In an embodiment, the phosphorus antioxidant is model REVONOX 608 available from CHITEC TECHNOLOGY CO., LTD.

In an embodiment, when the hindered phenol antioxidant and the phosphorus antioxidant are used in mixture, a ratio of the two is in a range of about 1:5 to about 5:1, for example, 1:4, 1:3, 1:2, 1:1, 2:1, 3:1 or 4:1.

In step S106, a fiber spinning step is performed to obtain a temperature-responsive fiber. In an embodiment, fiber spinning conditions include a spinning temperature of about 270° C. to 295° C. and a spinning speed of about 2,000 to 3,000 meters per minute.

The disclosure further provides a temperature-responsive fiber, including about 1 part by weight of a temperature-responsive material, about 5 to 20 parts by weight of polybutylene terephthalate (PBT), and about 50 to 200 parts by weight of polyethylene terephthalate (PET).

In an embodiment, the temperature-responsive material has a structure represented by formula (I). In an embodiment, the temperature-responsive fiber may further include about 0.1 to 0.35 parts by weight of an antioxidant, and the antioxidant is, for example, a hindered phenol antioxidant, a phosphorus antioxidant or a combination thereof. When the antioxidant is a combination of the hindered phenol antioxidant and the phosphorus antioxidant, a ratio of the two is in a range of about 1:5 to about 5:1. In an embodiment, a fiber specification of the temperature-responsive fiber is 75d/72f to 75d/36f.

Effects of the disclosure are demonstrated by a plurality of comparative examples and embodiments below.

In an embodiment, a method for preparing the temperature-responsive material includes the following steps. First, 200 grams of a compound of formula (1), 400 grams of a compound of formula (2), and 3,500 ml of water are mixed. Then, 500 ml of IN nitric acid solution containing 10 grams of a cerium (IV) initiator is added to the mixture, followed by reaction at 55° C. for 5 hours. Upon cooling after completion of the reaction, the precipitate is filtered and dried to obtain the temperature-responsive material.

In an embodiment, a material of the cerium (IV) initiator includes ceric ammonium nitrate, and has a structure represented by the following formula:

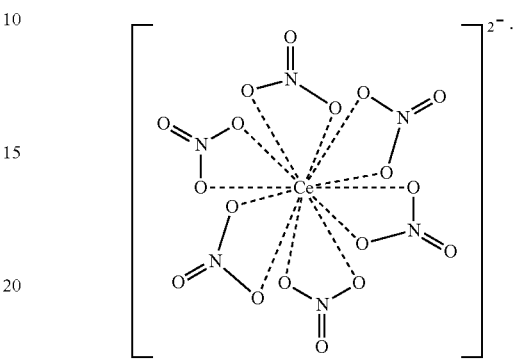

In an embodiment, the cerium (IV) initiator is CAS NO. 16774-21-3 available from ACROS ORGANICS Ltd.

In an embodiment, the compound of formula (1) and the compound of formula (2) have the following structures:

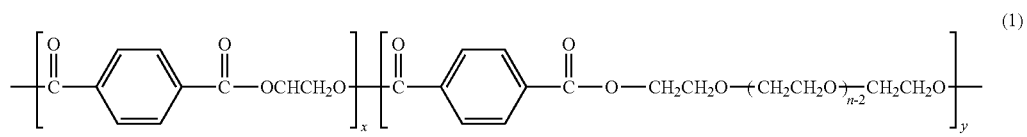

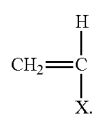

In formula (1), x and y are in a molar ratio of 9:1 to 1:3; n is an integer of 7 to 120; and m is an integer of 70 to 500.

In formula (2), X has a structure represented by formula (i) or formula (ii):

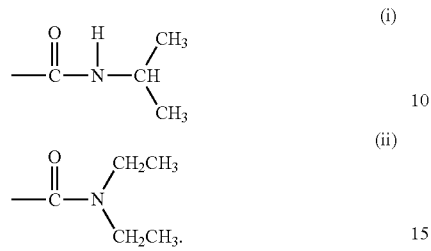

In an embodiment, the temperature-responsive material prepared by using the foregoing method has a structure represented by formula (I-1):

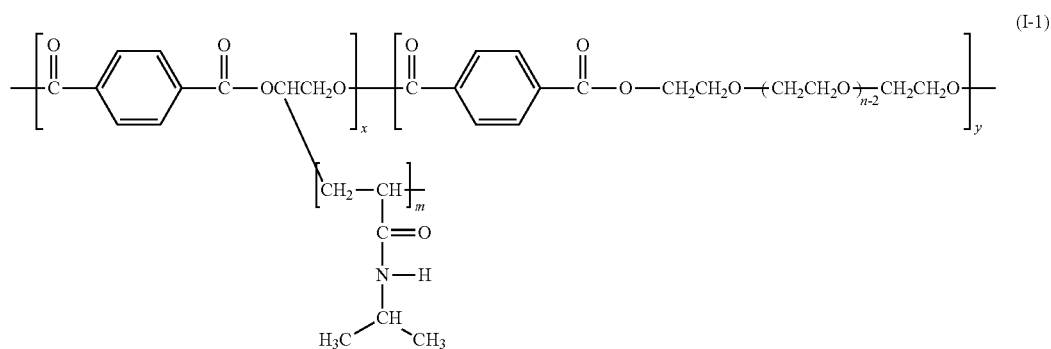

where x and y are in a molar ratio of 9:1 to 1:3; n is an integer of 7 to 120; and m is an integer of 70 to 500.

In another embodiment, the temperature-responsive material prepared by using the foregoing method has a structure represented by formula (I-2):

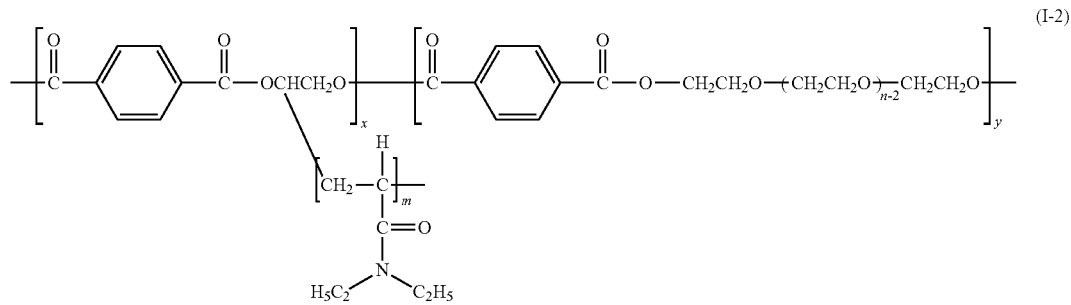

where x and y are in a molar ratio of 9:1 to 1:3, n is an integer of 7 to 120, and m is an integer of 70 to 500.

Next, various temperature-responsive fibers are prepared according to composition formulas in Table 1. Then, properties of the temperature-responsive fibers are tested.

TABLE 1

| | Weight proportion of temperature-responsive material (overall concentration %) | PBT | PET | Antioxidant A | Antioxidant B | Specification of yarn | Fiber strength (g/d) | Elongation (%) |
|---|---|---|---|---|---|---|---|---|
| Comparative Example 1 | 0 | 0 | 100 | 0 | 0 | 75d/72f round section | 3.46 | 27.7 |
| Example 1 | 10 (0.8 wt %) | 190 | 1050 | 0.625 | 1.25 | 75d/72f round section | 2.89 | 36.8 |
| Example 2 | 10 (1.0 wt %) | 190 | 800 | 0.5 | 1 | 75d/72f round section | 2.87 | 35.9 |
| Example 3 | 10 (1.2 wt %) | 190 | 633 | 0.417 | 0.833 | 75d/72f round section | 2.89 | 36 |
| Example 4 | 10 (0.8 wt %) | 190 | 1050 | 2.5 | 0.625 | 75d/48f cross-shaped section | 2.71 | 31.7 |
| Example 5 | 10 (1.0 wt %) | 190 | 800 | 0 | 0 | 50d/48f round section | 2.84 | 32.6 |
| Example 6 | 10 (0.9 wt %) | 90 | 1011 | 0 | 0 | 75d/72f round section | 3.01 | 26.8 |
| Example 7 | 10 (1.2 wt %) | 90 | 733 | 0 | 0 | 75d/72f round section | 2.8 | 36.1 |
| Example 8 | 10 (0.5 wt %) | 90 | 1900 | 0 | 0 | 75d/36f round section | 3.34 | 23.2 |
| Example 9 | 10 (1.0 wt %) | 90 | 900 | 0 | 0 | 75d/36f round section | 2.9 | 36 |

Note 1:
The unit in the composition formula is part by weight
Note 2:
Antioxidant A: DEOX 3114 (hindered phenol antioxidant)
Note 3:
Antioxidant B: REVONOX 608 (phosphorus antioxidant)

As can be learned from Comparative Example 1 and Embodiments 1 to 9 in table 1, when the temperature-responsive material of the disclosure is used in a range of 0.5 to 1.2 wt %, the fiber can still have certain fiber strength and elongation. In addition, according to results of Embodiments 1 to 9, the yarn of the disclosure may have a round or cross-shaped section, and may have good fiber strength and elongation.

Then, the polyester yarn in Example 3 is woven into dyed garters, which are washed with water washing for different numbers of times and then subjected to a drying time test and a test of endothermic under removing moisture. The results are shown in Table 2.

TABLE 2

| Sample | 90% moisture drying time | Endothermic under removing moisture (° C.) |
|---|---|---|
| Comparative Example 1 0 wt % temperature-responsive material dyed crimson | 26'32" | 1.3 |
| Example 3 1.2 wt % temperature-responsive material dyed crimson-washed 0 times | 16'15" (38.76%) | — |
| Example 3 1.2 wt % temperature-responsive material dyed crimson-washed 5 times | 13'18" (49.87%) | — |
| Example 3 1.2 wt % temperature-responsive material dyed crimson-washed 10 times | 13'46" (48.12%) | — |

TABLE 2-continued

| Sample | 90% moisture drying time | Endothermic under removing moisture (° C.) |
|---|---|---|
| Example 3 1.2 wt % temperature-responsive material dyed crimson-washed 20 times | 14'14" (46.36%) | 2.5 |

Note 1:
90% moisture drying time: The time required for evaporation of 90% of moisture is measured by using a method which is modified based on AATCC-199, where the temperature of the test environment is 20° C., the humidity of the test environment is 65%, the temperature of the test heat plate is 35° C., and the volume of water is 0.1 ml.
Note 2:
Moisture desorption and heat absorption: The temperature variation is measured by using a method which is an improvement based on ISO 16533-2014 9.4.2 modified, where the ambient temperature is 35° C., and the humidity variation is from 90 ± 3% to 40 ± 3%.

As can be seen from Table 2, compared with a fabric not including the temperature-responsive material of the disclosure (Comparative Example 1), a fabric including the temperature-responsive material of the disclosure (Example 3) requires a shorter drying time. Even if the fabric is washed for 5 times, 10 times, or 20 times, the test result still indicates a shorter drying time.

Then, a double sided fabric is fabricated, where an outer layer is made of ordinary polyester fiber 75d/72f/round section (70 wt %), and an inner layer is made of a temperature-responsive fiber 75d/48f/cross-shaped section (30 wt %); and is then subjected to a moisture absorption and fast drying test in Table 3 and a moisture absorption and heat desorption as well as moisture desorption and heat absorption test in Table 4.

TABLE 3

| Example 4 | Test temperature | Test result | Test method |
|---|---|---|---|
| Diffusion capacity Wicking area (mm$^2$) | 20° C. 35° C. | 1834 (5)[1] 1713 (5) | FTTS-FA-004-2011 4.1 |

TABLE 3-continued

| Example 4 | Test temperature | Test result | Test method |
|---|---|---|---|
| Drying rate | 20° C. | 16 (4) | FTTS-FA-179-2018 |
| Residual moisture percentage (%) after 40 minutes | 35° C. | 2 (5) | |
| Moisture absorption rate (seconds) | 20° C. | 0.4 (5) | FTTS-FA-004-2011 4.3 dropping method |

Note 1:
The digit in the brackets represent the level, where 5 represents a highest level, and a smaller digit indicates a lower level.

Note 1: The digit in the brackets represent the level, where 5 represents a highest level, and a smaller digit indicates a lower level.

TABLE 4

| Example 4 | Test conditions and results | | Test method |
|---|---|---|---|
| Exothermic under adding moisture (° C.) | Initial temperature | 20.1 | Modified base on ISO 16533-2014 9.4.1 |
| | Highest temperature | 21.8 | Ambient temperature: 20° C. Humidity variation: from 40 ± 3% to 90 ± 3% |
| | Temperature difference | +1.7 | |
| Endothermic under removing moisture (° C.) | Initial temperature | 36.1 | Modified base on ISO 16533-2014 9.4.2 |
| | Lowest temperature | 34.1 | Ambient temperature: 35° C. Humidity variation: from 90 ± 3% to 40 ± 3% |
| | Temperature difference | −2 | |

As can be seen from Table 3, the fabric including the temperature-responsive material of the disclosure (Example 4) has: a good diffusion capacity at a low temperature of 20° C. and a high temperature of 35° C.; a low drying rate at a low temperature of 20° C., indicating reduced heat loss (anti-chilling after exercise); a fast drying rate at a high temperature of 35° C., indicating a good cooling effect; and a high moisture absorption rate at a low temperature of 20° C., indicating reduced moisture loss (anti-chilling after exercise).

As can be seen from Table 4, the fabric including the temperature-responsive material of the disclosure (Example 4) can decrease heat loss to provide a heat preservation function when the humidity changes from 40±3% (low humidity) to 90±3% (high humidity) at a low temperature of 20° C., and therefore can be applied to clothing suitable for wearing during warm-up and exercise. In addition, at a high temperature of 35° C., the fabric can increase drying ability to provide a cooling effect when the humidity changes from 90±3% (high humidity) to 40±3% (low humidity), and therefore can be applied to clothing suitable for wearing during rest after exercise.

Based on the above, in the disclosure, the intrinsic temperature-responsive fiber can be prepared by adjusting the proportions of the temperature-responsive material, the polyester base material (PBT, PET), and the antioxidant. The intrinsic temperature-responsive fiber of the disclosure can effectively change the degree of hydrophilicity/hydrophobicity as the ambient temperature or body temperature changes so as to dynamically adjust the temperature and humidity. The dynamic temperature and humidity regulation is achieved mainly by means of exothermic under adding moisture as well as endothermic under removing moisture. When the temperature decreases, the material becomes highly hydrophilic, i.e., has an increased bonding capacity to water, so that moisture diffusion becomes slow. Because the pores of the fabric become smaller after the fabric absorbs water, the air permeability is reduced. When the temperature rises, the material becomes weak hydrophilic, i.e., has a decreased bonding capacity to water, so that moisture diffusion is accelerated and a cooling effect is achieved through evaporation of moisture. Therefore, the intrinsic temperature-responsive fiber of the disclosure can overcome the disadvantage of conventional clothing with moisture absorption and sweat dissipation which loses the temperature/humidity regulation function due to sultriness in the case of saturated humidity during exercise, and can be widely applied to the field of functional clothing and fabrics.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A temperature-responsive material, comprising a structure represented by formula (I):

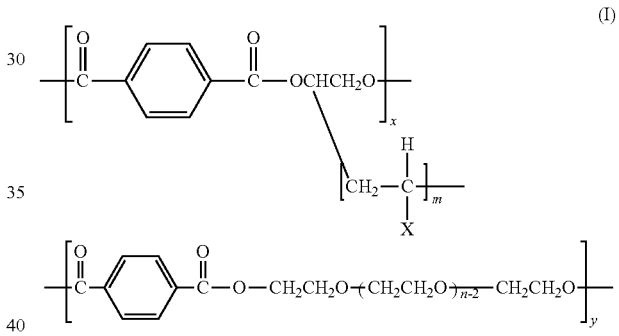

wherein in formula (I),

X has a structure represented by formula (i) or formula (ii):

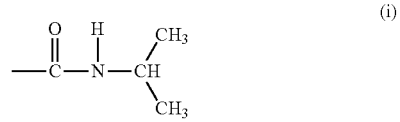

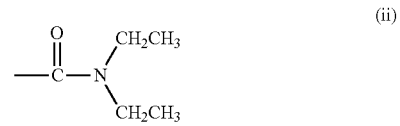

x and y are in a molar ratio of 9:1 to 1:3,
n is an integer of 7 to 120, and
m is an integer of 10 to 1,000.

2. The temperature-responsive material according to claim 1, wherein a weight-average molecular weight of the temperature-responsive material is 10,000 to 150,000.

3. The temperature-responsive material according to claim 1, wherein a lower critical solution temperature (LCST) of the temperature-responsive material is 29° C. to 35° C.

4. A temperature-responsive fiber, comprising:
1 part by weight of a temperature-responsive material;
5 to 20 parts by weight of polybutylene terephthalate (PBT); and
50 to 200 parts by weight of polyethylene terephthalate (PET),
wherein the temperature-responsive material has a structure represented by formula (I):

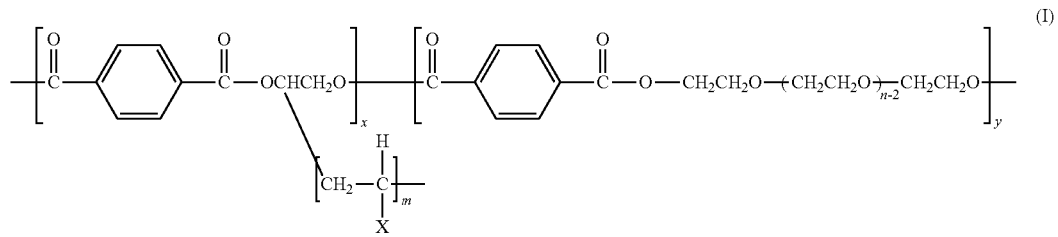

wherein in formula (I),
X has a structure represented by formula (i) or formula (ii):

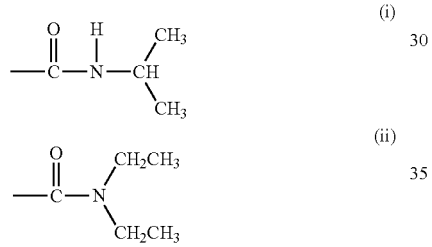

x and y are in a molar ratio of 9:1 to 1:3,
n is an integer of 7 to 120, and
m is an integer of 10 to 1,000.

5. The temperature-responsive fiber according to claim 4, further comprising 0.1 to 0.35 parts by weight of an antioxidant, wherein the antioxidant is a hindered phenol antioxidant, a phosphorus antioxidant, or a combination thereof.

6. The temperature-responsive fiber according to claim 5, wherein the antioxidant is a combination of the hindered phenol antioxidant and the phosphorus antioxidant at a ratio in a range of 1:5 to 5:1.

7. The temperature-responsive fiber according to claim 4, wherein a fiber specification of the temperature-responsive fiber is 75d/72f to 75d/36f.

8. A method for preparing a temperature-responsive fiber, comprising:
providing an intrinsic temperature-responsive masterbatch, comprising evenly mixing 5 to 20 parts by weight of polybutylene terephthalate (PBT) and 1 part by weight of a temperature-responsive material and performing a powder refinement step, a powder dispersion step, and a kneading granulation step to form the intrinsic temperature-responsive masterbatch;
providing a base material masterbatch, wherein the base material masterbatch comprises polyethylene terephthalate (PET);
mixing 6 to 21 parts by weight of the intrinsic temperature-responsive masterbatch and 50 to 200 parts by weight of the base material masterbatch; and
performing a fiber spinning step to obtain a temperature-responsive fiber, wherein the temperature-responsive material has a structure represented by formula (I):

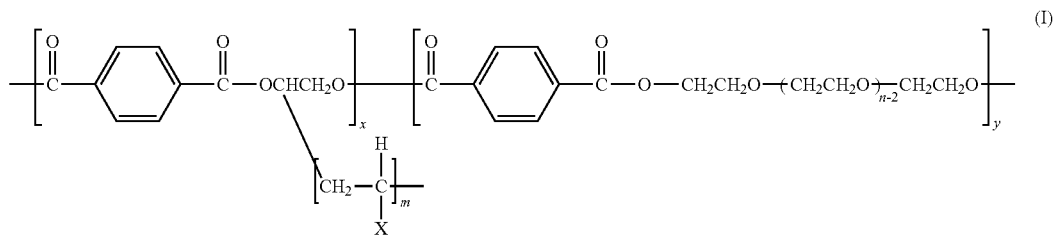

wherein in formula (I),

X has a structure represented by formula (i) or formula (ii):

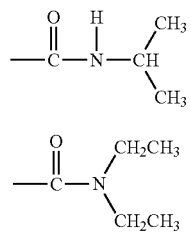

x and y are in a molar ratio of 9:1 to 1:3,
n is an integer of 7 to 120, and
m is an integer of 10 to 1,000.

9. The method for preparing the temperature-responsive fiber according to claim 8, wherein a spinning temperature is 270° C. to 295° C. and a spinning speed is 2,000 to 3,000 meters per minute in the fiber spinning step.

10. The method for preparing the temperature-responsive fiber according to claim 8, wherein a particle size of the temperature-responsive material after the powder refinement step and the powder dispersion step is in a range of 1 μm to 500 μm.

11. The method for preparing the temperature-responsive fiber according to claim 8, the step of evenly mixing 5 to 20 parts by weight of polybutylene terephthalate (PBT) and 1 part by weight of the temperature-responsive material comprising adding 0.1 to 0.35 parts by weight of an antioxidant and evenly mixing the antioxidant, the PBT, and the temperature-responsive material.

* * * * *